July 10, 1962 O. S. HASSING 3,043,906
ELECTRO-MECHANICAL PRODUCTION OF HALF-TONE BLOCKS
Filed Aug. 9, 1960 2 Sheets-Sheet 1
FIG. 1
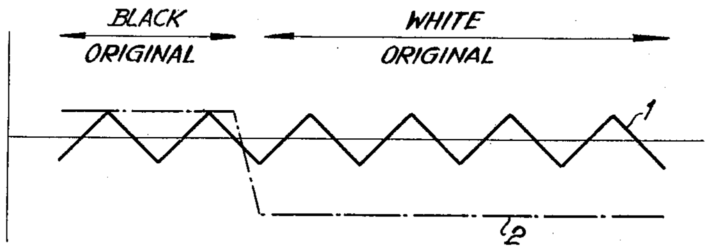
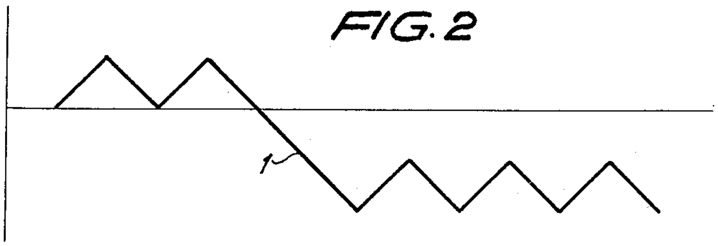
FIG. 2
FIG. 3a FIG. 3b
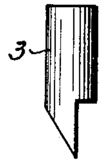
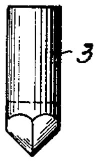
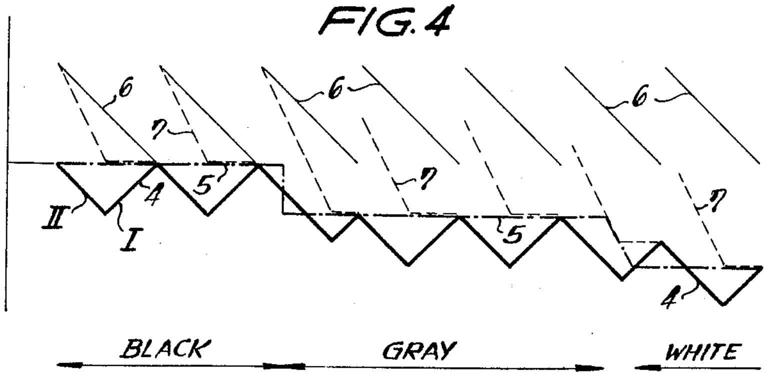
FIG. 4
INVENTOR
OLUF SINIUS HASSING
BY Amster & Levy
ATTORNEYS INVENTOR
OLUF SINIUS HASSING
By Amster + Levy
ATTORNEYS United States Patent Office 3,043,906
Patented July 10, 1962

3,043,906

ELECTRO-MECHANICAL PRODUCTION OF HALF-TONE BLOCKS

Oluf Sinius Hassing, 57 Taunusstrasse, Neu Isenburg, near Frankfurt am Main, Germany Filed Aug. 9, 1960, Ser. No. 48,386
Claims priority, application Germany Aug. 17, 1959
4 Claims. (Cl. 178—6.6)

Figures 5, 6:
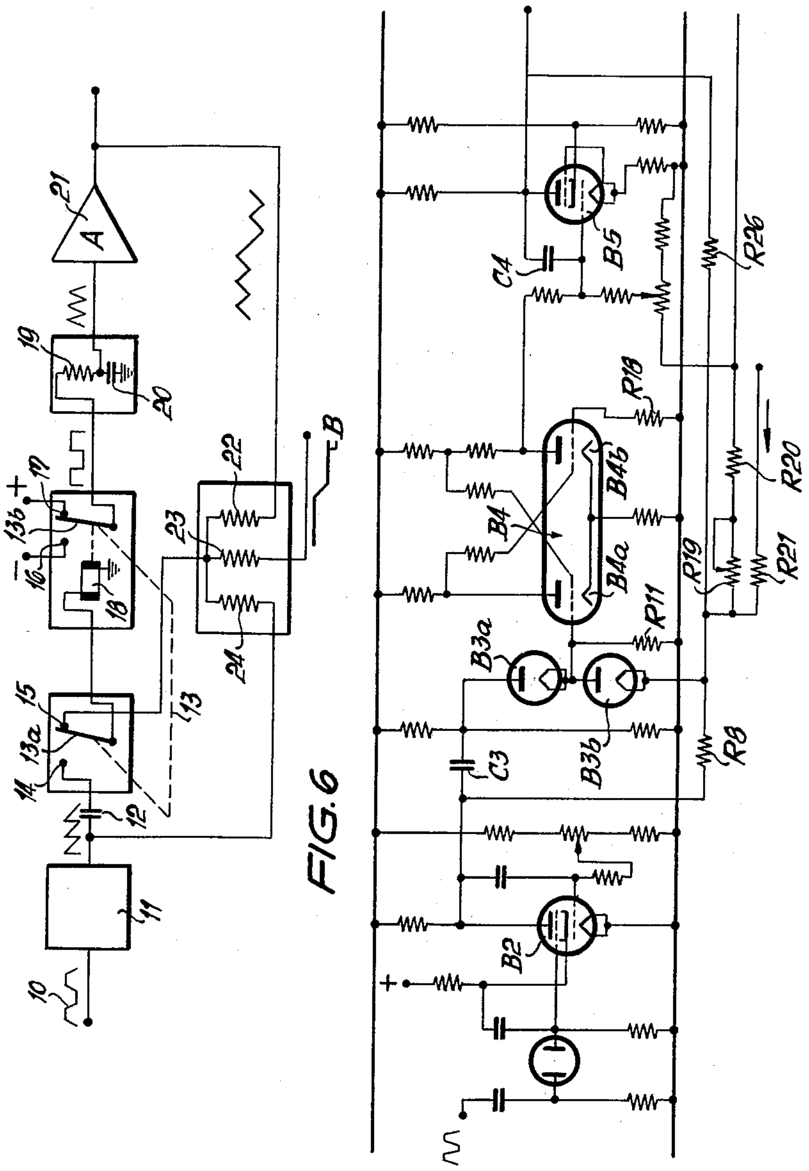

This invention relates to a method of and apparatus for the production of half-tone blocks, by means of a recording element, for example an engraving element, which is controlled by means of an electrical control voltage derived from the screen and picture signal obtained by scanning an original, and which enables the block to be treated, for example engraved, solely with excess-surface elements having linear boundaries, since the control signal consists only of linear portions having alternately a first and a second slope having opposite directions of inclination, the transition from a point of the first portion of the slope to the second portion of the slope occurring only at a predetermined time which is linearly dependent on the screen cycle, while the intermediate time of the transition from a point of the second portion of the slope to the first portion of the slope is determined in dependence on the value of the picture signal.

A condition for a good half-tone block is that the screen elements should constitute a regular pattern both individually and in their entirety. It is well known that this can be achieved by feeding to the recording element a screen signal which is synchronized with the movement of the block plate. An electromagnetic cutting tool controlled in this way performs an upward and downward movement of a determined amplitude in the circumstances. If a picture signal obtained by scanning an original is superimposed on the cutting tool, then the cutting tool stylus penetrates into the block or printing plate, while retaining its screen signal amplitude, according to the brightness of the original.

It is known to superimpose the picture signal on a triangular screen signal, but this does not give screen elements having linear boundaries or flanks. A block produced in this way is unsatisfactory. The attempt has therefore been made to build up the control signal for a screen element from linear line portions having a constant positive slope in alternation with linear line portions having a preferably but not necessarily equally opposite slope.

In these circumstances, however, the problem is how to ensure in the best and simplest manner that the mean height or level of the engraving element always has the exact values corresponding to the brightness of the original and that at the same time the individual screen elements are engraved at their exact corresponding place.

A solution is known for this (German patent specification No. 960,693) based on the fact that in the control current for the engraving device for the production of the screen elements the position of the extreme amplitude value of the other sign situated between two extreme amplitude values of the same sign is determined by the intensity of the signal current at a previous time.

This necessitates the presence of a storage device or "memory" in which the intensity can be stored for a certain period. This involves complicated circuits, however, and results in a displacement of the screen elements in relation to the original. Moreover, this has no parallelism between the ascending and descending flanks of the signal current, and this has an adverse effect on the screen structure.

The object of the present invention is to obviate the above disadvantages.

The invention consists essentially in that the picture signal is compared with the sum of the control signal and another signal, which sum at each moment within a screen cycle indicates those values which the control signal should reach towards the end of the current screen cycle, so that the transition between the second part of the slope and the first part of the slope occurs when the algebraic sum of the said sum and of the picture signal reaches a predetermined value.

The extent by which the control signal can further increase or decrease at a given moment before the end of a screen cycle is a linear function of the time. Simple circuitry can be provided for this purpose to permit an algebraic addition of the control signal and of the other signal with the opposed slope in the best part of a screen cycle and a comparison of this sum with the picture signal. The other signal is preferably at the same time the screen signal which is converted into a saw-toothed signal in a synchronized saw-tooth generator. The circuitry advantageously consists only of a coupling element, a resistance block for the individual signals, and a bi-stable multivibrator.

A special circuit for the control of the engraving voltage may advantageously consist in that the screen signal is connected to the bistable multivibrator on the one hand through a coupling condenser which passes the saw-tooth voltage of the screen signal but blocks its inclined component, and on the other hand through a resistance which in turn passes the inclined component of the voltage, the said multivibrator changing over, with the saw-tooth voltage of the screen signal, into a certain position from which it swings back into its starting position when the sum of the picture signal, screen signal and the control signal reaches a critical value, whereby a rectangular signal is produced which, by means of an R.C. network, becomes the control signal feeding the engraving system.

The derivation of a control signal to prepare a half-tone block from a screen signal is admittedly known but in this case the control signal is obtained by integration of the output signal from a multivibrator with an adjustable signal length, which is controlled by screen pulses. The voltage obtained in this way by integration does not form the control system of the engraving system however. The signal for feeding the engraving system is, on the contrary, obtained by modulating the said voltage in amplitude and time by means of the picture signal.

Further features, advantages and applications of the present invention will be apparent from the embodiments which will now be described by way of example with reference to the accompanying drawings, in which:

FIGURE 1 shows the control signal and the picture signal with the two extreme values, black and white, FIGURE 2 shows the required path of the point of the stylus of an engraving element with the picture signal curve indicated in FIGURE 1, FIGURES 3*a* and 3*b* are side and front views of an ordinary stylus, FIGURE 4 shows the path of the stylus point according to the control system of the present invention, FIGURE 5 is a block circuit diagram of an electrical circuit arrangement for performing the method according to the invention, and FIGURE 6 is a special circuit for deriving a control signal according to the invention.

FIGURE 1 represents a screen signal 1 of the kind used with the hitherto known processes for electro-mechanical block production. The shape of the screen signal also corresponds to the path covered by the point of the stylus of an engraving element. The broken line 2 illustrates the picture signal with its two extreme values "black" and "white."

FIGURE 2 shows the required path of the point of the stylus 3 when the screen signal is influenced by the picture signal according to FIGURE 1. On cutting the "black," the distance between the stylus point at its lowermost bottom point and the block plate is zero, so that said stylus does not penetrate into the plate. When cutting the "white," the surface of the block plate is completely cut away. In the case of relief blocks, the stylus point just touches the block plate surfaces for black, while no material points are left for white.

The shape of the stylus is illustrated in FIGURE 3. This stylus has straight flanks and cuts into the plate depressions having the form of pyramids with a rectangular base. When cutting white, it is no obstruction if the stylus point penetrates into the material somewhat more deeply than necessary to remove any excess surface (under-cutting) but for brightness values between black and white the depth of penetration must correspond exactly to the tone values of the original.

Line 4 in FIGURE 4 shows the path of the stylus and line 5 the corresponding brightness value of the original (picture signal). From left to right, the line 5 represents black, grey and white. The line 4 also corresponds to the control signal of the engraving tool.

Maximum values of the stylus path correspond to the transitions between the ascending portion of the slope and the descending portion of the slope.

The solid inclined lines 6 in FIGURE 4 indicate for each moment the extent by which the control signal can rise at a maximum before the end of a screen cycle. The broken lines 7 indicate for each moment the values the control signal can still reach at the end of the screen cycle.

The lines 7 correspond to the sum of the control signal 4 and of the signal represented by the lines 6. At the point of intersection of the line 7 with the picture signal 5 there is a transition from the descending to the ascending portion of the slope. The following maximum of the control signal then represents the values which the picture signal 5 had at the moment of transition.

In this way a control signal is obtained which consists solely of linear descending and linear rising slope portions, the vertical position of the stylus point corresponding to the value of the picture signal.

FIGURE 5 is a circuit diagram for producing the required control signal. A screen signal 10, which is synchronized with the movement of the original and of the block, and which has a greatly deformed sine-wave shape, controls a saw-tooth generator 11. The saw-tooth voltage at the output of saw tooth generator 11 is the voltage referred to as 6 in FIG. 4, which has a steep side. Over the coupling condenser 12, it is passed to contact 14 of a contact means formed as a bipolar switch 13 having two arms **13*a*, 13*b*. The arms may be brought into contact either with the contacts 14 and 16 or with the contacts 15 and 17. The arm 13*a* cooperating with the contact 15 is connected to a switch means such as a polarized relay 18 which is at earth potential. The arm 13*b* of the switch cooperating with the contact 17 is connected to a resistance 19, which is at earth potential by way of a condenser 20. The point of connection between the resistance 19 and the condenser 20 is connected to the input of an amplifier 21. At this connection, as described in greater detail below, is located the auxiliary signal having linearly ascending and linearly descending branches of equal slope. The amplifier output is coupled back through a resistance 22 to the contact 15 which is also connected by a resistance 23 to the picture signal B, coming from an amplifier (not shown), and to a third resistance 24** connected to the output of the saw-tooth generator.

The contacts 16 and 17 are each connected to a current source of different sign. Depending on the position of the arms of the switch, the condenser 20 is charged up by way of the resistance 19 with a positive or negative charge. If the time during which the switch occupies a certain position is short enough, then the charge of the condenser 20 decreases or increases linearly in dependence on the time. On the change-over from one position to the other, the voltage at the condenser thus alternately rises or drops. The amplifier 21 connected after the condenser 20 thus furnishes an output signal which has only linear rising and descending flanks.

In the position of the switch 13 shown in FIGURE 5, currents flow through the three resistances 22, 23 and 24 to the relay 18 and correspond to the output signal or control signal, the picture signal, and the saw-tooth screen signal from the generator 11.

The arrangement is so designed that the slowly varying part of the saw-tooth voltage acts on the relay 18 in such manner that it draws current and thus brings the switch into its other position when the algebraic sum of the three currents aforesaid becomes zero. The consequence is that the arm **13*b* of the switch 13 is shifted from the contact 17 to the contact 16. The slope of the output signal thus varies from the decreasing to the increasing portion (or vice-versa). The output of the saw-tooth generator is now connected by means of the condenser 12 and contact 14 to the relay 18. If the capacity of the condenser 12 is small, then the effect achieved is that the current through the relay also remains low, so that the latter does not respond to this current. At the next moment, the saw-tooth voltage returns to its maximum value, so that the relay again draws current, so that the switch 13** changes over again and the output signal varies its slope from the increasing to the decreasing portion or vice-versa.

If at this moment the picture signal is so large that the current flowing through the resistances 22, 23 and 24 causes the relay 18 to pull up, then the output signal decreases practically without any interruption until the level of the control voltage corresponding exactly to the picture signal is reached. A constant direct-current derived from a direct-current source may naturally be supplied to the relay 18 in order to ensure a change-over of the relay when the sum of the currents through the resistances 22, 23 and 24 has a determined value.

The operation is repeated below with the aid of FIG. 4. As previously mentioned, the lines 6 represent the course of the saw-tooth curves located on the connecting line between saw-tooth generator 11 and condenser 12. The saw teeth are declining linearly and then project again to the maximum in the block point cycle rhythm. In the time periods before the points of projection, switch arms **13*a*, 13*b* are positioned at contacts 14, 16. Because of its slope, the point of projection signal can pass condenser 12, and will go through contact 14 and switch blade 13*a* to relay 18 causing the latter to respond. The relay will place switch blades 13*a* and 13*b* in the position illustrated in FIG. 5. The voltage of the connection of resistances 22, 23 and 24 now is across relay 18. At the same time, current will go from source 17 through the line going through resistor 19 and condenser 20. The auxiliary signal now is on the linearly declining branch. Curve 4 constitutes the addition of the auxiliary signal and the amplified image signal. The sum is curve 7. The control signal at first is declining until curve 7 intersects the broken line, i.e. until the algebraic sum of the three signals is 0. The relay is set so that at this moment it will fall back into the opposite direction and switch blades 13*a* and 13*b* are applied to contacts 14 and 16. Due to the fact that switch blades 13*b* are applied now to contact 16 and to the other potential of the D.C. voltage source, curve 4 will rise again, until the next projection of saw tooth 6** comes.

Whereas the declining branch of the saw tooth cannot pass condenser 12, said projection can because of its faster change of voltage. Relay 18 again receives a pulse and falls back into the position indicated in FIG. 5. The operation begins again.

The theoretical electric circuit described can be embodied in many ways with the aid of known electronic means. FIGURE 6 shows a particular exemplified embodiment.

The saw-tooth generator 11 shown in FIGURE 5 comprises a thermionic tube B2 with associated circuit elements, while the relay 18 with the switch 13 is replaced by a trigger circuit using a double triode B4*a* and B4*b* with the associated resistances and series-connected diodes B3*a* and B3*b*.

The integrating condenser 20 with the following amplifier 21 is embodied by a pentode B5, using the known Miller circuit, where a condenser, in the present case C4, is connected between the control grid and the anode.

The function of this circuit corresponds initially to that of the circuit diagram shown in FIGURE 5.

The double triode B4 with the resistances R11 and R18 forms a bistable trigger circuit. The anode voltage of the tube B4*b* is either high or low, so that in consequence the grid voltage of B5 is either high or low. The circuit for the tube B5 (known as a Miller capacitance valve), is well known, and if the duration of the cycles of the decreasing or rising grid voltage is sufficiently short the voltage at the anode B5 decreases or increases linearly. The output signal of B5 thus receives the same shape as the output signal of the amplifier 21 shown in FIGURE 5.

The control of the bistable trigger circuit with the tube B4 and the associated resistances is effected theoretically in a similar manner to that shown in FIGURE 5, namely by means of the saw-tooth current on the one hand and the saw-tooth current in conjunction with the output signal and the picture signal on the other hand, possibly in combination with a constant direct-current.

Between the saw-tooth generator and the bistable trigger circuit are two series-connected diodes B3*a* and B3*b*. The point of connection of the cathode of the diode B3*a* and the anode of the diode B3*b* is connected to the control grid of the tube B4*a*. The control grid is connected by a leak-resistance R11 to the neutral conductor of the circuit. The anode of the diode B3*a* is connected by a condenser C3 to the output of the saw-tooth generator. The cathode of the diode B3*b* is connected by a resistance R8 likewise to the output of the saw-tooth generator. This cathode is further connected by a resistance R26 to the output of the Miller circuit (tube B5 and condenser C4) and also by a resistance R21 to the picture signal and by resistances R19 and R20 to a fixed reference potential.

The tube B4*a* conducts when the anode of the diode B3*a* becomes very positive, and in fact even if this is so only for a very short duration. This process of the tube B3*a* becoming positive occurs once within each screen cycle, namely when the saw-tooth generator B2 swings back, the condenser C3 performing the same function as the condenser 12 in FIGURE 5. The anode voltage of the tube B4*b* then becomes high. If the tube B4*a* is cut off for some reason, then the anode voltage of B4*b* also drops. The transition of the conditions in which the tube B4*b* becomes conductive and cut off takes place in a very short time so that the output of the tube B4*b* comprises rectangular signals which, on integration in the circuit with the tube B5, gives an output signal consisting of linear flanks. The transition from the increasing portion to the decreasing portion is effected per screen cycle, namely as a result of the fact that on the swinging back of the saw-tooth generator the anode of the diode B3*a* becomes positive so that the anode voltage of the tube B4*b* rises while the anode voltage of the tube B5 drops correspondingly.

The drop in the anode voltage of the tube B5 continues until the cathode voltage of the diode B3*b* has dropped to an extent such that the diode B3*b* becomes conductive. The tube B4*a* is then cut off while the tube B4*b* conducts and its anode voltage thus decreases, with the result that the anode of the tube B5 begins to rise. This rise must, according to the invention, now being at a moment such that the output signal can be brought to the correct values by the possible rise.

The signal which gives this possible rise in supplied by the saw-tooth generator as indicated hereinbefore. The action of the saw-tooth generator is generally known and will not be described further here. The slowly rising or decreasing part of the sawtooth voltage indicates at any moment how much the output signal can rise in the current screen cycle. The output signal passes through the resistance R26, the picture signal through the resistance R21, and the saw-tooth or screen signal through the resistance R8.

The point of connection of these three resistances is connected to the cathode of the diode B3*b* and also through the resistances R19 and R20 which form a variable resistance, to a source of constant negative voltage. The dimensioning of the circuit element concerned can be so selected that when the algebraic sum of the currents through the resistances R8, R26 and R21 is zero, the tube B4*b* conducts so that there is a transition from the decreasing part to the increasing part.

I claim:

1. An apparatus for the electro-mechanical engraving of half-tone blocks by scanning an original image, comprising first means for producing a saw-tooth voltage synchronous with the block point frequency and having one steep and one slowly descending side, second means for producing an auxiliary signal with branches of equal slope which are linearly ascending and descending, third means for producing an image signal proportionate to said original image, fourth means for the alegbraic addition of the image signal, the auxiliary signal and the saw-tooth voltage, contact means for actuating the second means so that the change-over of the auxiliary signal from the linearly ascending to the linearly descending course, and vice versa, will take place, with said contact means connected to the saw-tooth voltage by said second means during the auxiliary signal, said second means being set so that as the steep side of said saw-tooth is passed, the polarity of said contact means is reversed so that said second means are connected to said fourth mean for said algebraic addition of the image signal, the auxiliary signal and the saw-tooth voltage, and so that in the new position, said contact means are set so that they will reverse the polarity of said contact means back into the first position when said algebraic sum of the image signal, the auxiliary signal and the saw-tooth voltage has reached a predetermined point.

2. An apparatus according to claim 1 wherein said second means is a bistable multivibrator, said means for producing a saw-tooth voltage being connected alternatively to said bistable multivibrator by a coupling condenser which passes said saw-tooth voltage but cuts off its steep side and by a resistance which passes said steep side of said-tooth voltage so that a rectangular signal is produced.

3. An apparatus according to claim 2 wherein said multivibrator comprises a pair of diodes and a double triode.

4. An apparatus for the electro-mechanical engraving of half-tone blocks by scanning an original copy, comprising first means for producing a voltage of a saw tooth waveform synchronous with the block point frequency and having one steep and one slowly descending portion, second means for producing a square wave voltage having a first and second voltage level, third means for producing a control signal by deriving a triangular waveform from said square wave voltage, said triangular waveform having portions of preferably equal slope which are linearly ascending and descending, fourth means for producing an image signal proportiontae to the tone vlues of said original copy, fifth means for the algebraic addition of the image signal, the control signal and said saw tooth waveform voltage, voltage sensitive means for actuating the second means to change said square wave voltage from said first voltage level to said second voltage level when the algebraic sum of the image signal, the control signal and the voltage of said saw tooth wave form has reached a predetermined point, and means sensitive to the voltage during the steep portion of said saw tooth waveform for actuating the second means to change the square wave voltage return from the second voltage level to the first voltage level.

References Cited in the file of this patent

UNITED STATES PATENTS

| | | |
|---|---|---|
| 2,312,042 | Losier et al. | Feb. 23, 1943 |
| 2,838,599 | Hardi | June 10, 1958 |